(12) United States Patent
Osakabe et al.

(10) Patent No.: US 10,900,913 B2
(45) Date of Patent: Jan. 26, 2021

(54) X-RAY DIFFRACTION APPARATUS

(71) Applicant: Rigaku Corporation, Tokyo (JP)

(72) Inventors: Takeshi Osakabe, Tokyo (JP); Tetsuya Ozawa, Tokyo (JP)

(73) Assignee: RIGAKU CORPORATION, Tokyo (JP)

( * ) Notice: Subject to any disclaimer, the term of this patent is extended or adjusted under 35 U.S.C. 154(b) by 232 days.

(21) Appl. No.: 15/668,746

(22) Filed: Aug. 4, 2017

(65) Prior Publication Data
US 2018/0052121 A1 Feb. 22, 2018

(30) Foreign Application Priority Data
Aug. 18, 2016 (JP) .................... 2016-160316

(51) Int. Cl.
| | |
|---|---|
| *G01N 23/20* | (2018.01) |
| *G01N 23/04* | (2018.01) |
| *G01N 23/20008* | (2018.01) |
| *G01N 23/20025* | (2018.01) |
| *G01N 23/201* | (2018.01) |
| *G01N 23/207* | (2018.01) |

(52) U.S. Cl.
CPC ....... *G01N 23/20075* (2013.01); *G01N 23/04* (2013.01); *G01N 23/201* (2013.01); *G01N 23/207* (2013.01); *G01N 23/20008* (2013.01); *G01N 23/20025* (2013.01); *G01N 2223/33* (2013.01)

(58) Field of Classification Search
CPC ........... G01N 23/20075; G01N 23/207; G01N 23/04; G01N 23/20023; G01N 23/201
USPC ............................................. 378/71
See application file for complete search history.

(56) References Cited

U.S. PATENT DOCUMENTS

| 5,373,544 A | 12/1994 | Goebel |
|---|---|---|
| 2011/0268251 A1 | 11/2011 | He |
| 2012/0195406 A1 | 8/2012 | Asano et al. |

FOREIGN PATENT DOCUMENTS

| EP | 0 091 150 A1 | 3/1983 |
|---|---|---|
| JP | 49-28955 Y1 | 8/1974 |
| JP | H10-048398 | 2/1998 |
| JP | 2012-177688 | 9/2012 |

OTHER PUBLICATIONS

Extended European Search Report dated Nov. 7, 2017.
Office Action dated Mar. 3, 2020, issued in counterpart EP Application No. 17 183 860.0 (8 pages).

*Primary Examiner* — David P Porta
*Assistant Examiner* — Abra S Fein
(74) *Attorney, Agent, or Firm* — Westerman, Hattori, Daniels & Adrian, LLP

(57) ABSTRACT

An X-ray diffraction apparatus including an X-ray detector that is configured to detect diffracted X-rays diffracted from a sample when a surface of the sample is irradiated with X-rays, a counter arm which rotates around a rotation center axis set within the surface of the sample while the X-ray detector is installed on the counter arm, and a plate-like X-ray shielding member that is installed on the counter arm and rotated together with the X-ray detector.

6 Claims, 10 Drawing Sheets

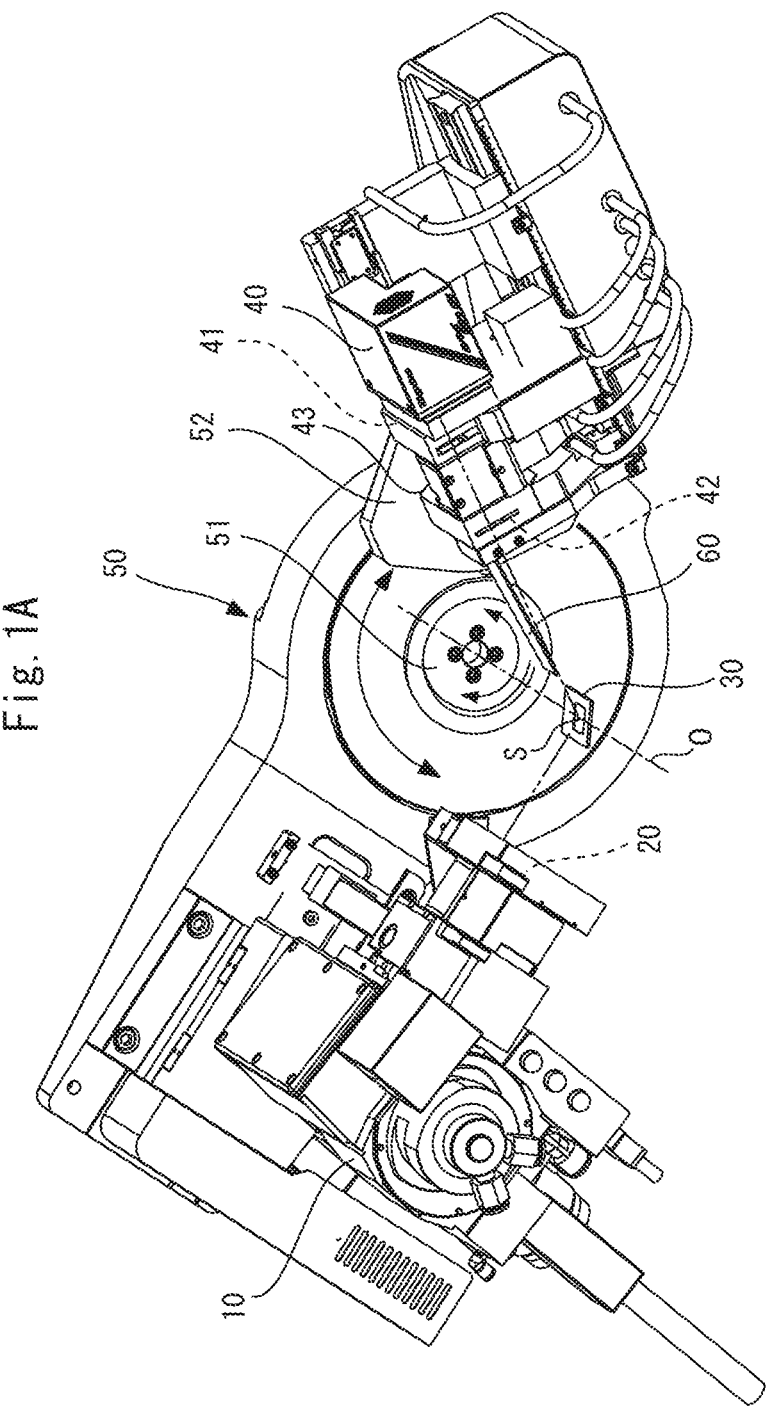
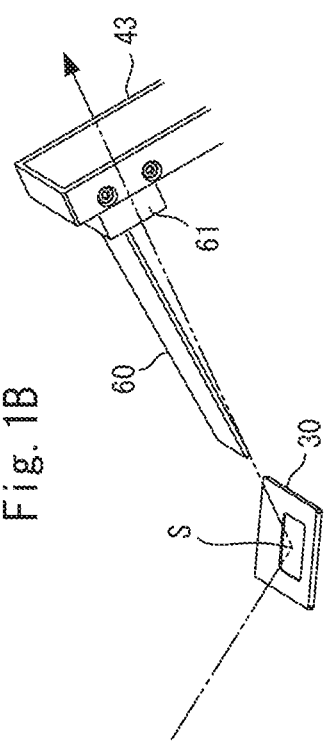
Fig. 1A
Fig. 1B

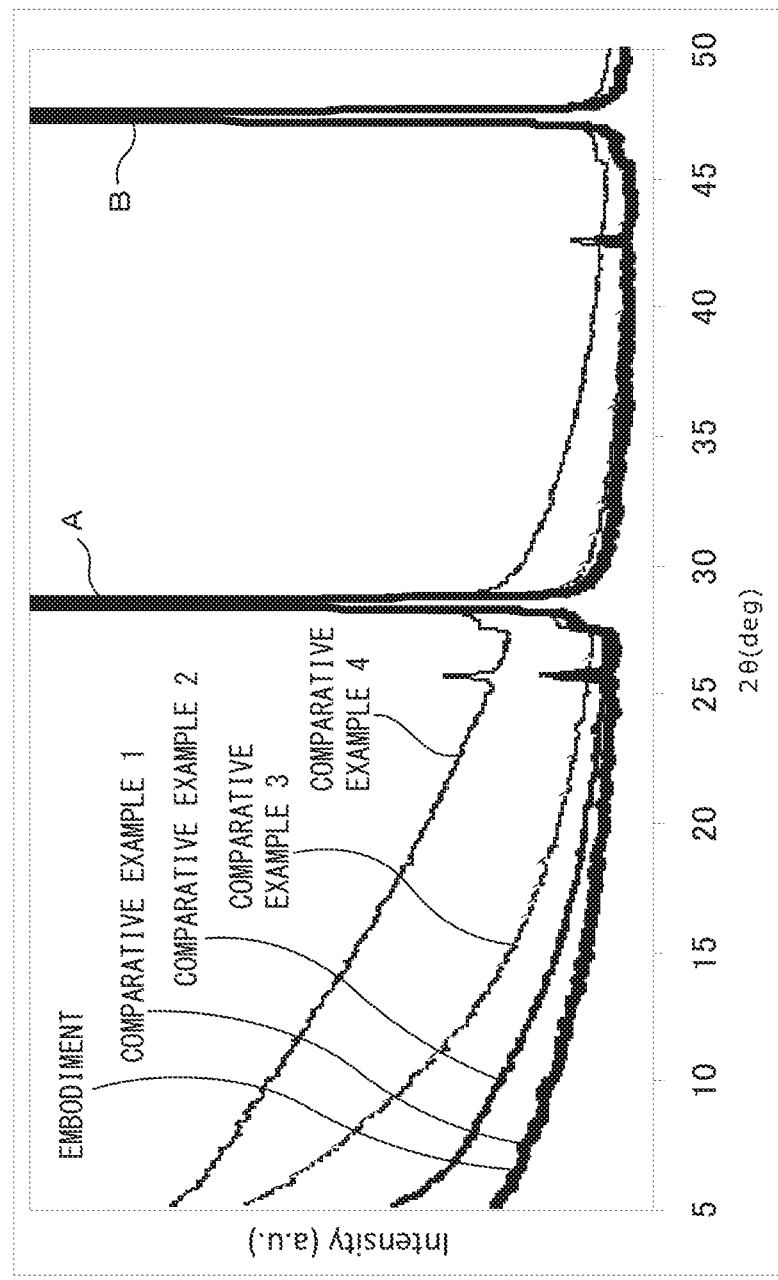

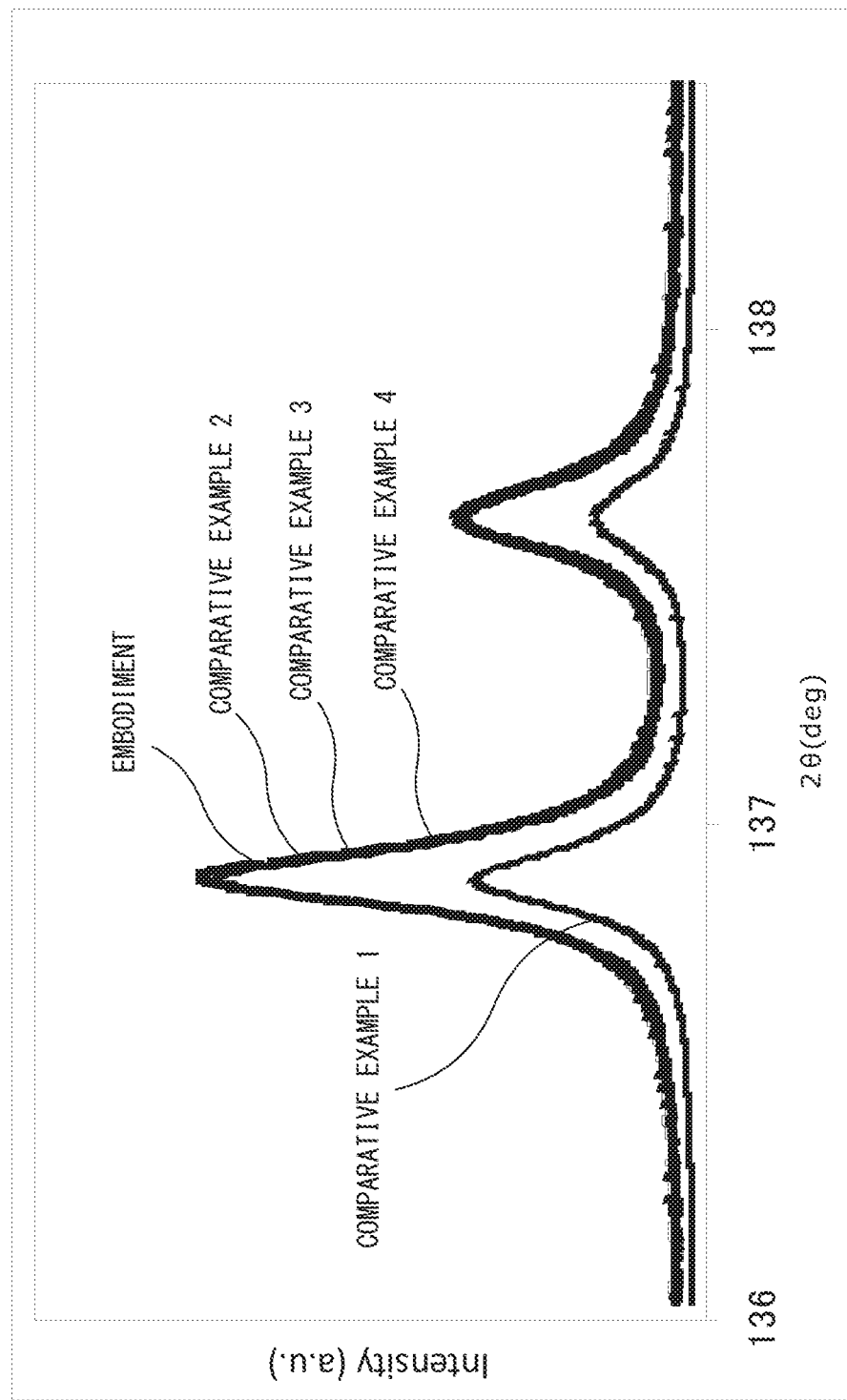

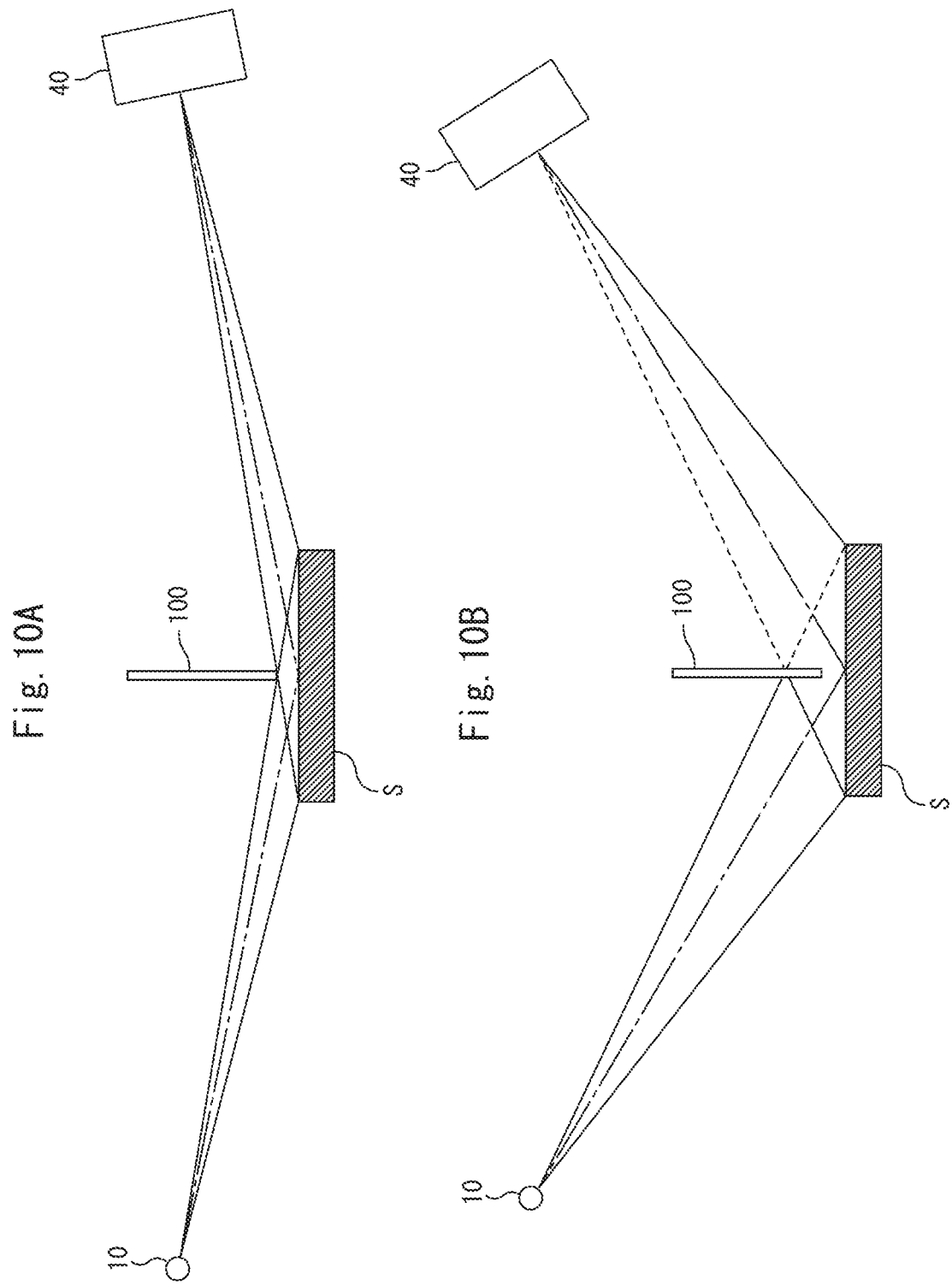

X-RAY DIFFRACTION APPARATUS

PRIORITY CLAIM

This application claims the benefit of priority from Japanese Patent Application No. JP2016-160316 filed Aug. 18, 2016, which is incorporated by reference.

BACKGROUND

1. Field of the Invention

The present invention relates to an X-ray diffraction apparatus, and more particularly to an X-ray diffraction apparatus having an X-ray shielding member for preventing the incidence of scattered X-rays to an X-ray detector under X-ray diffraction measurements.

2. Description of Related Art

According to a general X-ray diffraction apparatus, a sample is irradiated with X-rays emitted from an X-ray source while divergence of the X-rays is limited to a predetermined angle range by a divergence angle limiting slit (also called as "divergence slit"). When a Bragg's diffraction condition is satisfied between the X-rays irradiated to a sample and crystal lattice planes of the sample, X-rays are diffracted from the sample, and the diffracted X-rays from the sample are detected by an X-ray detector.

In a normal X-ray diffraction apparatus, for example, scattered X-rays occur when X-rays emitted from an X-ray source impinge against a divergence angle limiting slit. Scattered X-rays also may occur when X-rays impinge against air. These scattered X-rays cause background noise to diffracted X-rays diffracted from a sample as a measurement target and thus scattered X-rays emitted from other materials than the sample must be prevented from being incident to an X-ray detector as much as possible.

When a detector which is configured to detect diffracted X-rays in a narrow range like a scintillation counter or the like is used as an X-ray detector, it is normal to arrange a receiving slit and an anti-scatter slit in front of the X-ray detector. A lot of scattered X-rays occurring at the divergence angle limiting slit are shielded by the receiving slit and the anti-scatter slit.

However, when a one-dimensional X-ray detector such as a photosensor array or PSPC (Position Sensitive Proportional Counter) is arranged in a scan direction and used as an X-ray detector, or when a two-dimensional X-ray detector such as CCD or a pixel detector which detects diffracted X-rays in a planarly broad range is used as an X-ray detector, a space in which the receiving slit and the anti-scatter slit (also called as scattering slit) are arranged cannot be secured in front of the X-ray detector, so that a lot of scattered X-rays are incident to the X-ray detector. As a result, there is a risk that background noise of measurement data associated with the diffracted X-rays increases and thus the measurement precision is reduced.

In order to overcome the background noise increasing problem caused by scattered X-rays as described above, according to a conventional X-ray diffraction apparatus disclosed in JP-A-10-48398 (Patent Document 1), an X-ray shielding member is arranged so as to confront a sample through a gap (interval) for passing incident X-rays therethrough. X-rays emitted from an X-ray source are passed through the gap between the X-ray shielding member and the sample and irradiated to the surface of the sample. At this time, the X-ray shielding member shields scattered X-rays at a confronting position where the X-ray shielding member confronts the sample, thereby preventing incidence of the scattered X-rays to the X-ray detector.

In the conventional X-ray diffraction apparatus disclosed in Patent Document 1, the X-ray shielding member is fixed so as to be kept at a fixed relative position with respect to the sample while an X-ray diffraction measurement is executed. Therefore, the gap for passing incident X-rays therethrough is kept to have a fixed dimension.

Furthermore, when the incident angle $\theta$ of X-rays to the sample is changed by so-called $\theta$-$2\theta$ scan performed under X-ray diffraction measurements, the width of incident X-rays at the confronting position of the sample where the X-ray shielding member is installed also varies according to the change of the incident angle $\theta$.

Therefore, the conventional X-ray diffraction apparatus which is configured so that the gap formed between the sample and the X-ray shielding member is kept unchangeable have had a risk that the gap becomes narrower than the width of the incident X-rays so that the X-ray shielding member shields the incident X-rays or conversely the gap becomes wider than the width of the incident X-rays, so that scattered X-rays partially pass through the gap.

Therefore, the applicant of the present application has proposed an X-ray diffraction apparatus disclosed in JP-A-2012-177688 (Patent Document 2). This X-ray diffraction apparatus is incorporated with a mechanism capable of moving an X-ray shielding member interlocking with the operation of a goniometer, and configured so that when the incident angle $\theta$ of X-rays to the sample is changed, the gap between the X-ray incident face of the sample and the X-ray shielding member is adjustable in conformity with the variation of the width of the incident X-rays.

According to this X-ray diffraction apparatus, the X-ray shielding member is configured to be also movable according to the change of the X-ray incident angle to the sample by the goniometer during execution of an X-ray diffraction measurement so that the width of the gap between the X-ray shielding member and the X-ray incident face of the sample is adjusted to a proper width matched with the width of incident X-rays or diffracted X-rays. As a result, it is possible to make the incident X-rays incident to the sample and prevent scattered X-rays appearing around the incident X-rays from being incident to the X-ray detector.

However, the incorporation of the mechanism capable of moving the X-ray shielding member interlockingly with the operation of the goniometer in the X-ray diffraction apparatus has caused a disadvantage that the structure of the X-ray diffraction apparatus is complicated.

SUMMARY

The inventors of the present application have proposed and developed a rectangular cylinder type X-ray shielding tube 200 as shown in FIGS. 8A and 8B. The X-ray shielding tube 200 is installed on a counter arm of the goniometer in the X-ray diffraction apparatus. The X-ray shielding tube 200 is configured so as to take diffracted X-rays diffracted from the sample into a hollow portion thereof and make the diffracted X-rays incident to an X-ray detector through the hollow portion, thereby preventing incidence of scattered X-rays to the X-ray detector.

The X-ray shielding tube 200 shown in FIGS. 8A and 8B is configured so as to be divided into two parts at an intermediate portion thereof and include front and rear tube bodies 202 and 203 which are joined to each other by a joint member 201. A gap is formed at the intermediate portion, and both the front and rear tube bodies 202 and 203 confront each other through the gap. An X-ray shielding plate 204 referred to as "direct beam stopper" is inserted in the gap as occasion demands, whereby X-rays which are emitted from an X-ray source 10 and directly enter the hollow portion of the X-ray shielding tube 200 in a low-angle scan region can be blocked by the X-ray shielding plate 204 to prevent the X-rays from the X-ray source 10 from being directly incident to the X-ray detector.

In the X-ray diffraction apparatus shown in FIG. 8A, when the rectangular cylinder type X-ray shielding tube 200 shown in FIG. 8B is approached to a sample S, a bottom portion 200a of the distal end of the X-ray shielding tube 200 interferes with a sample stage 30 as shown in FIG. 9B, and thus the X-ray shielding tube 200 must be arranged at a position which is apart from the sample S to some extent. In order to cause diffracted X-rays diffracted from the sample S in an angular direction conformed with the Bragg's law pass through the hollow portion of the X-ray shielding tube 200 at a distance from the sample S, the position in height of the X-ray shielding tube 200 is also required to be apart from the surface of the sample S to some extent. In a case where the X-ray shielding tube 200 is located to be higher than the surface of the sample S, particularly when the diffracted X-rays from the sample are detected in the low-angle scan region, a lot of scattered X-rays caused by various elements may intrude into and pass through the hollow portion of the X-ray shielding tube 200 together with the diffracted X-rays from the sample, which may cause increase of background noise.

The present invention has an object to provide an X-ray diffraction apparatus capable of preventing scattered X-rays occurring under X-ray diffraction measurements from being incident to an X-ray detector with high accuracy by a simple configuration.

In order to attain the above object, there is provided an X-ray diffraction apparatus comprising an X-ray detector that is configured to detect diffracted X-rays diffracted from a sample when a surface of the sample is irradiated with X-rays, a counter arm that rotates around a rotation center axis set within the surface of the sample while the X-ray detector is installed on the counter arm, and a plate-like X-ray shielding member that is installed on the counter arm and rotates together with the X-ray detector.

The X-ray shielding member is a constituent element for shielding scattered X-rays which may be incident to the X-ray detector. By installing the X-ray shielding member on the counter arm and rotating the X-ray shielding member together with the X-ray detector, the scattered X-rays can be properly shielded, and incidence of the scattered X-rays to the X-ray detector can be prevented with a simple configuration which does not need any dedicated driving mechanism. In addition, by configuring the X-ray shielding member in the form of a plate, the X-ray shielding member can be approached to the sample without interfering with a sample stage, and scattered X-rays can be shielded at a position close to the sample.

In general, the counter arm of the X-ray diffraction apparatus is configured to rotationally scan the X-ray detector to the high angle side on which the inclination angle of the X-ray detector with respect to the surface of the sample increases while a position within a plane flush with the surface of the sample is set as the origin of scanning on a low angle side.

The X-ray shielding member is preferably installed on the counter arm to be arranged on the high angle side of diffracted X-rays which are diffracted from the sample and incident to the X-ray detector.

There is a tendency that a lot of scattered X-rays are incident to the X-ray detector together with diffracted X-rays in a low-angle scan region. By arranging the X-ray shielding member on the high angle side of diffracted X-rays, scattered X-rays which may be incident to the X-ray detector together with diffracted X-rays can be efficiently shielded particularly in the low-angle scan region. In the low-angle scan region, the X-ray shielding member is located at a height close to the surface of the sample on the low angle side of diffracted X-rays, thereby suppressing the increase of background noise caused by scattered X-rays passing through the low angle side.

Furthermore, the distal end of the X-ray shielding member regulates the boundary of the high angle side through which diffracted X-rays are transmissible, and the surface portion of the X-ray shielding member is arranged to be inclined with respect to a straight line connecting the center of an X-ray irradiation region on the surface of the sample and the distal end (for example, the lower edge of the distal end), whereby scattered X-rays which may be incident from the high angle side of diffracted X-rays to the X-ray detector can be shielded by the surface portion.

On the assumption that the X-ray diffraction apparatus of the present invention contains a configuration for limiting the divergence angle of X-rays emitted from the X-ray source by a divergence angle limiting slit, the optimum position of the X-ray shielding member can be calculated by the following mathematical formulas (1) and (2).

That is, it is preferable to arrange the X-ray shielding member at a position where the lower edge of the distal end is spaced from the rotation center axis of the counter arm within the plane flush with the surface of the sample by only the distance X0 calculated by the following mathematical formula (1), and higher than the surface of the sample by only the height Y0 calculated by the following mathematical formula (2) under the state that the X-ray detector is arranged at the origin of scanning on the low angle side.

By arranging the X-ray shielding member at such a position, scattered X-rays which may be incident to the X-ray detector can be properly shielded in the low-angle scan region by the X-ray shielding member, and the background noise can be reduced. In addition, in the high-angle scan region, proper intensity data of diffracted X-rays can be achieved while the X-ray shielding member does not shield X-rays emitted from the X-ray source to the sample and diffracted X-rays diffracted from the sample.

$$X0 = R\{\cos(90deg - \theta\max) - \sin(90deg - \theta\max) \times \tan(\theta\max - DS/2)\} \quad (1)$$

$$Y0 = \frac{(W/2) \times \sin(\theta 1) + \{(W/2) \times \cos(\theta 1) + X0\} \times \{D/2 - (W/2) \times \sin(\theta 1)\}}{R + (W/2) \times \cos(\theta 1)} \quad (2)$$

R: the distance from the rotation center of the counter arm to a detection face of the X-ray detector, θmax: the maximum scan angle on the high angle side of the counter arm (the angle with respect to the surface of the sample), DS: the angle of aperture of the divergence angle limiting slit, W: the width of the sample, θ1: the incident angle of X-rays with respect to the surface of the sample when the irradiation width of X-rays is equal to the width of the sample, and D: the length of the detection face of the X-ray detector in the scan direction.

Furthermore, according to the present invention, the X-ray diffraction apparatus may be configured so that the X-ray shielding member comprises a strip-shaped flat plate, the strip-shaped flat plate is bent at both the side edges thereof to form side edge portions, and the height of the side edge portions is matched with Y0 calculated by the mathematical formula (2).

With the foregoing configuration, the strength of the X-ray shielding member is increased, and the height of the X-ray shielding member with respect to the surface of the sample can be adjusted while using the side edge portions as a guide, so that an adjusting work when the X-ray shielding member is installed on the counter arm can be facilitated.

As described above, the X-ray diffraction apparatus of the present invention can prevent incidence of scattered X-rays occurring under X-ray diffraction measurements to the X-ray detector with high precision by a simple configuration.

Further objects, features and advantages of this invention will become readily apparent to persons skilled in the art after a review of the following description, with reference to the drawings and claims that are appended to and form a part of this specification.

BRIEF DESCRIPTION OF THE DRAWINGS

FIG. 1A is a perspective view showing the external appearance of an X-ray diffraction apparatus according to an embodiment of the present invention;

FIG. 1B is an enlarged perspective view showing an X-ray shielding member;

FIG. 5 is a graph showing a measurement result in a low-angle scan region according to the embodiment of the present invention;

FIG. 6 is a graph showing a measurement result in a high-angle scan region according to the embodiment of the present invention;

FIGS. 10A and 10B are explanatory diagrams showing the difference in action and effect between the embodiment of the present invention and conventional apparatus 1.

DETAILED DESCRIPTION

Figure 2A:
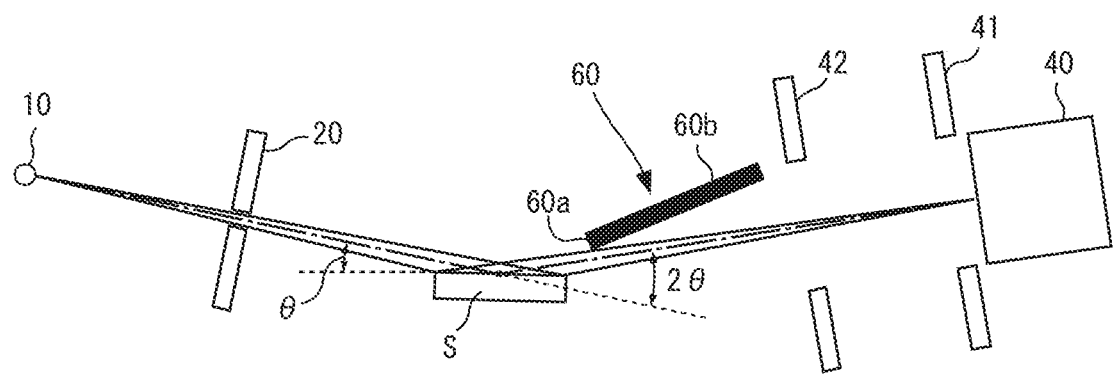
FIGS. 2A and 2B are schematic diagrams showing the X-ray diffraction apparatus according to the embodiment of the present invention.
Figure 2B:
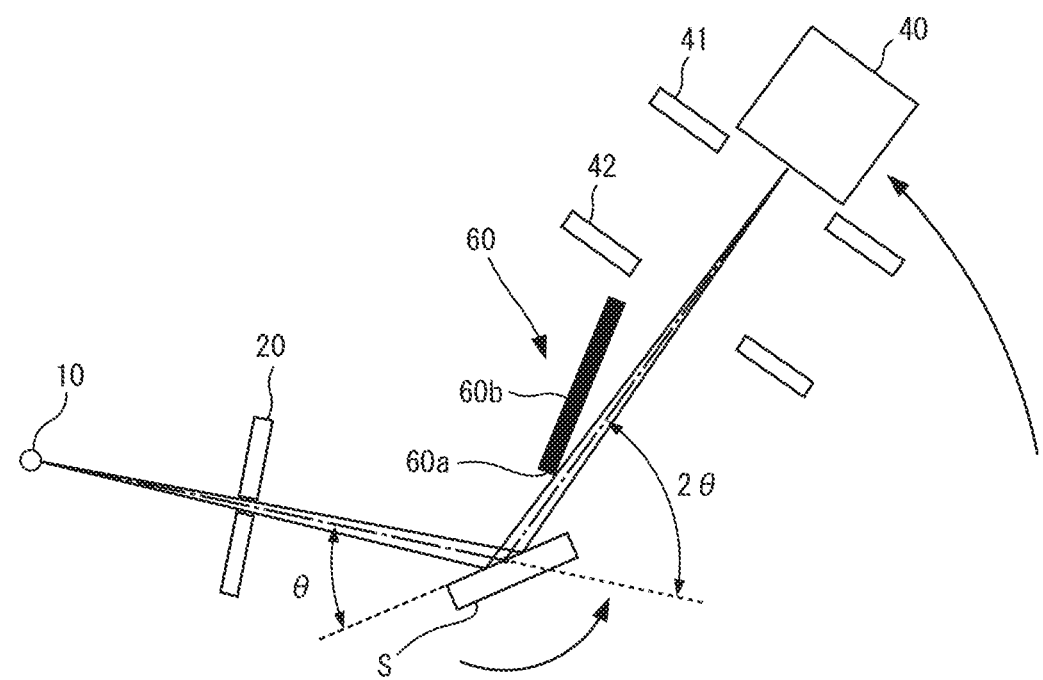

FIG. 1A is a perspective view showing the external appearance of an X-ray diffraction apparatus according to an embodiment of the present invention. FIGS. 2A and 2B are schematic diagrams showing the X-ray diffraction apparatus according to the embodiment of the present invention.

As shown in these figures, the X-ray diffraction apparatus according to the embodiment of the present invention includes an X-ray source 10 for emitting X-rays, a divergence angle limiting slit 20 for limiting the divergence angle of X-rays, a sample stage 30 for holding a sample S and an X-ray detector 40 for detecting diffracted X-rays.

A receiving slit 41 and an anti-scatter slit 42 are provided in front of the X-ray detector 40, but these slits may be omitted.

X-rays emitted from the X-ray source 10 are irradiated to the surface of the sample while the divergence angle of the X-rays is limited by the divergence angle limiting slit 20. As well known, when X-rays are irradiated to the surface of the sample S (parallel to the crystal lattice planes) at an angle of θ, the X-rays are diffracted in an angle direction of 2θ with respect to incident X-rays (θ with respect to the surface of the sample S) based on the Bragg's law. The angle at which the X-rays are diffracted is determined by the material constituting the sample S. Therefore, the material constituting the sample S can be analyzed by detecting the diffraction angle of X-rays and the intensity of diffracted X-rays.

The X-ray diffraction apparatus performs an X-ray diffraction measurement while changing the positional relationship (θ-2θ) on the relative angles among the surface of the X-ray source 10, the surface of the sample S held on the sample stage 30 and the X-ray detector 40, and thus the X-ray diffraction apparatus is equipped with a goniometer 50.

The goniometer 50 includes a sample rotating mechanism 51 for rotating the sample stage 30 around a rotation center axis O set within the surface of the sample S, and a counter arm 52 rotating around the same rotation center axis O. The X-ray detector 40, the receiving slit 41 and the anti-scatter slit 42 are installed on the counter arm 52.

In FIG. 1A, the sample stage 30 is illustrated as floating in the air, but the sample stage 30 is actually fitted to the sample rotating mechanism 51 through a support unit (not shown).

The counter arm 52 rotationally scans the X-ray detector 40 to a high angle side where the inclination angle of the X-ray detector 40 with respect to the surface of the sample S increases while a position within a plane flush with the surface of the sample S is set as an origin of scanning on a low angle side.

The incident angle θ of X-rays from the X-ray source 10 to the surface of the sample S is adjusted by rotating the sample stage 30 with the sample rotating mechanism 51, and the X-ray detector 40 is arranged so as to face the direction of an angle 2θ (that is, the direction along which X-rays are diffracted from the sample S) with respect to incident X-rays by the rotation of the counter arm 52.

The X-ray diffraction apparatus having the foregoing basic configuration is further equipped with a plate-like (or tabular) X-ray shielding member 60. FIG. 1B is an enlarged view of the X-ray shielding member 60. In this embodiment, the X-ray shielding member 60 comprises a strip of flat plate. The X-ray shielding member 60 is formed of a material through which X-rays are not transmissible. For example, the X-ray shielding member 60 may be manufactured with metal materials such as brass, steel material, lead, etc.

The X-ray shielding member 60 is installed on the counter arm 52. In this embodiment, the base portion of the X-ray shielding member 60 serves as a fitting portion, and the base portion is configured so as to be fixed to a slit support housing 43 installed on the counter arm 52 through a mount unit 61. The slit support housing 43 is a constituent part which supports the receiving slit 41 and the anti-scatter slit 42 therein. The mount unit 61 is fixed to the slit support housing 43 by a fastener such as a bolt or the like.

The mount unit 61 is incorporated with a position adjusting mechanism (not shown) which enables the X-ray shielding member 60 to be mounted on the mount unit 61 so that the position of the distal end of the X-ray shielding member 60 is freely adjustable. The position adjusting mechanism, for example, may be configured by incorporating the main body of the mount unit 61 with a movable member which is freely movable in two orthogonal directions and freely rotatable and fixing the base portion of the X-ray shielding member 60 to the movable member.

The method of installing the X-ray shielding member 60 on the counter arm 52 is not limited to the foregoing method, and it is preferable to perform a proper design in consideration of the configurations of the X-ray detector 40 and other peripheral equipment to be installed on the counter arm 52.

Here, the installation position of the X-ray shielding member 60 on the counter arm 52 is adjusted so that the X-ray shielding member 60 is arranged on a high angle side with respect to diffracted X-rays which are diffracted from the sample S and incident to the X-ray detector 40, and a boundary of an X-ray transmissible region on the high angle side is regulated by the distal end 60a of the X-ray shielding member 60.

As described above, there is a tendency for a lot of scattered X-rays to be incident to the X-ray detector 40 together with diffracted X-rays in a low-angle scan region. Accordingly, by arranging the X-ray shielding member 60 on a high angle side of diffracted X-rays diffracted from the sample S, it is possible to efficiently shield scattered X-rays which may be incident to the X-ray detector 40 together with diffracted X-rays particularly in the low-angle scan region.

Furthermore, the X-ray shielding member 60 is arranged so that the surface portion 60b thereof is upward inclined with respect to a straight line which passes through the center of an X-ray irradiation region on the surface of the sample S and the lower edge of the distal end 60a of the X-ray shielding member 60. The upward-inclined arrangement of the X-ray shielding member 60 enables the surface portion 60b to shield the scattered X-rays which may be incident from a high angle side of diffracted X-rays to the X-ray detector 40.

Next, the optimum arrangement of the X-ray shielding member 60 will be described with reference to FIGS. 3A and 3B.

Figure 3A:
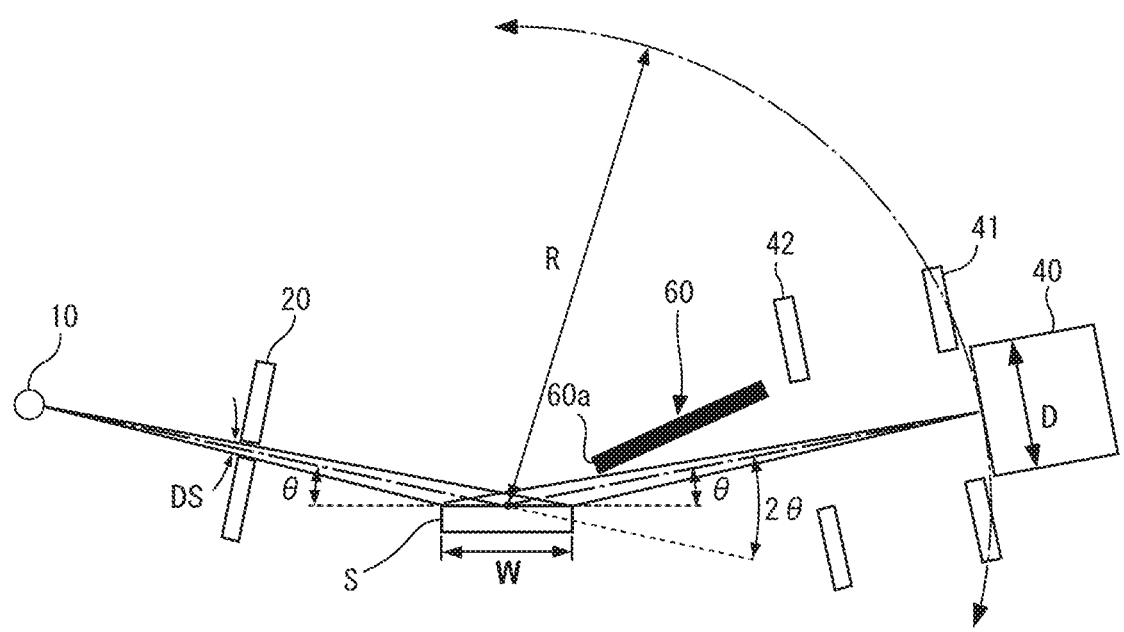
FIGS. 3A and 3B are explanatory diagrams showing proper positions of the X-ray shielding member relative to the surface of a sample in the embodiment of the present invention.
Figure 3B:
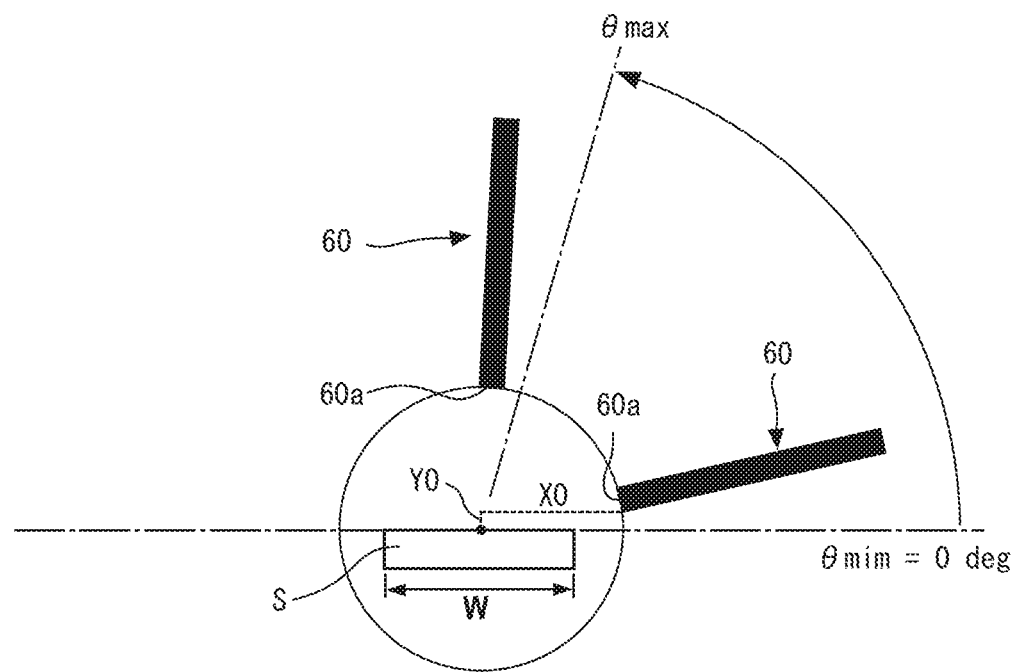

As shown in an enlarged view of FIG. 3B, it is preferable to arrange the X-ray shielding member 60 so that the lower edge of the distal end 60a is spaced from the rotation center axis O of the counter arm 52 within the plane flush with the surface of the sample S by only the distance X0 calculated by the following mathematical formula (1), and higher than the surface of the sample S by only the height Y0 calculated by the following mathematical formula (2) under the state that the X-ray detector 40 is arranged at the origin of scanning on the low angle side (the angle (θmin) of the X-ray detector 40 with respect to the surface of the sample S is equal to 0 degrees; and the angle (2 θmin) of the X-ray detector 40 with respect to the incident X-rays is equal to 0 degrees).

$$X0 = R\{\cos(90deg - \theta max) - \sin(90deg - \theta max) \times \tan(\theta max - DS/2)\} \quad (1)$$

$$Y0 = \frac{(W/2) \times \sin(\theta 1) + \{(W/2) \times \cos(\theta 1) + X0\} \times \{D/2 - (W/2) \times \sin(\theta 1)\}}{R + (W/2) \times \cos(\theta 1)} \quad (2)$$

Here, R, θmax, DS, W, θ1 and D in the mathematical formulas (1) and (2) represent the dimensions and specifications of the respective constituent elements (see FIG. 3A).

R: the distance from the rotation center of the counter arm 52 to the detection face of the X-ray detector 40, θmax: the maximum scan angle on the high angle side of the counter arm 52 (the angle with respect to the surface of the sample S), DS: the angle of aperture of the divergence angle limiting slit 20, W: the width of Sample S, θ1: the incident angle of X-rays with respect to the surface of the sample S when the irradiation width of X-rays is equal to the width of the sample S, and D: the length of the detection face of the X-ray detector 40 in the scan direction.

θ1 may be calculated by the following mathematical formula.

$$\theta 1 = \arctan(S1/C1)$$

$$C1 = \frac{2R\tan^2(DS/2) + sqrt\left\{\begin{array}{l}4R^2\tan^4(DS/2) - 4(1 + \tan^2(DS/2)) \times \\ (R^2\tan^2(DS/2) - (W/2)^2)\end{array}\right\}}{2 \times [1 + \tan^2(DS/2)]}$$

$$S1 = sqrt((W/2)^2 - (C1)^2)$$

The lower edge of the distal end 60a of the X-ray shielding member 60 is located at the position (X0, Y0) determined by the mathematical formulas (1) and (2), whereby the height of the distal end 60a of the X-ray shielding member 60 is set to be near to the surface of the sample S in the low-angle scan region, so that scattered X-rays directed to the X-ray detector 40 can be properly shielded, and thus the background noise can be reduced. When the X-ray detector 40 is moved to a high-angle scan region, the distal end 60a of the X-ray shielding member 60 is farther away from the surface of the sample S in connection with the movement of the X-ray detector 40, so that proper intensity data of diffracted X-rays can be achieved with shielding neither X-rays emitted from the X-ray source 10 to the sample S nor diffracted X-rays diffracted from the sample S by the X-ray shielding member 60.

As described above, the action and effect of the present invention can be more effectively achieved by locating the lower edge of the distal end 60a of the X-ray shielding member 60 at the position (X0, Y0) determined by the mathematical formulas (1) and (2). However, the lower edge of the distal end 60a of the X-ray shielding member 60 may be located at a position deviated from the optimum condition described above as occasion demands.

Next, the action and effect of the X-ray diffraction apparatus according to the embodiment will be described.

First, the X-ray diffraction apparatus according to this embodiment is configured so that the X-ray member shielding 60 is moved together with the counter arm 52 by merely installing the plate-like X-ray shielding member 60 on the counter arm 52. Therefore, it is unnecessary to equip a driving mechanism for driving the X-ray shielding member 60 interlockingly with the counter arm 52 as disclosed in Patent Document 2, so that the configuration of the X-ray diffraction apparatus can be simplified.

In addition, according to the X-ray diffraction apparatus of this embodiment, the distal end 60a of the X-ray shielding member 60 is located to be near to the surface of the sample S in the low-angle scan region, so that scattered X-rays which occur more frequently in the low-angle scan region can be efficiently shielded by the X-ray shielding member 60 to prevent incidence of the scattered X-rays to the X-ray detector 40. Consequently, the background noise in the low-angle scan region in measurement results can be reduced.

Furthermore, in the high-angle scan region in which the inclination angle of the X-ray detector 40 is high, the distal end 60a of the X-ray shielding member 60 is farther away from the surface of the sample S and located at a higher position, so that incident X-rays to the sample S and diffracted X-rays diffracted from the sample S are not shielded by the X-ray shielding member 60. Accordingly, reduction of the amount of diffracted X-rays incident to the X-ray detector 40 can be suppressed in the high-angle scan region.

According to the X-ray diffraction apparatus of this embodiment, installation of the X-ray shielding member 60 on the counter arm 52 brings the following action and effect.

That is, the X-ray shielding member 60 can be incorporated in combination with a sample stage 30 ($\chi$ (chi) cradle or the like) in the X-ray diffraction apparatus, which has been impossible in prior arts as disclosed in Patent Documents 1 and 2 due to interference between the X-ray shielding member and the sample stage.

Furthermore, an optical system for incident X-rays can be adjusted, and the position of the sample S can be adjusted while the X-ray shielding member 60 is installed on the counter arm 52.

In the case of X-ray diffraction measurements for plural samples S having different surface heights, when each of the plural samples S is disposed on the sample stage 30, the X-ray diffraction measurements can be performed without adjusting the height of the X-ray shielding member 60 every time the position of each sample S is adjusted (the position of each sample S is adjusted so that the surface of the sample is aligned with the rotation axis of the goniometer 50) because the difference (Y0) in height between the X-ray shielding member and the surface of each sample S mounted on the sample stage is fixed.

Furthermore, peripheral equipment such as a camera for observation or the like may be mounted so as to confront the surface of the sample S, so that the X-ray diffraction apparatus is adaptable to various optical systems such as a vertical transmission optical system, etc.

In addition, a dome type attachment may be mounted so as to surround the sample S.

The present invention is not limited to the above-described embodiment, and various modifications and applications may be adopted.

Figure 4A:
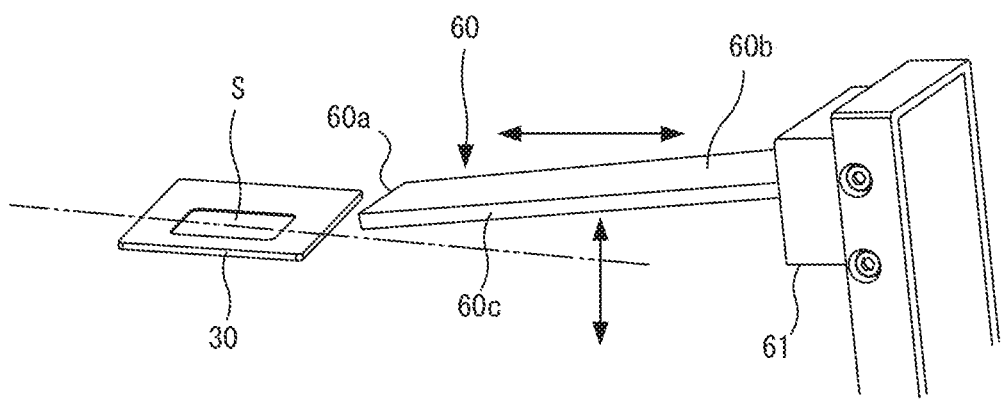
FIG. 4A is a perspective view showing a modification of the X-ray shielding member in the embodiment of the present invention.
Figure 4B:
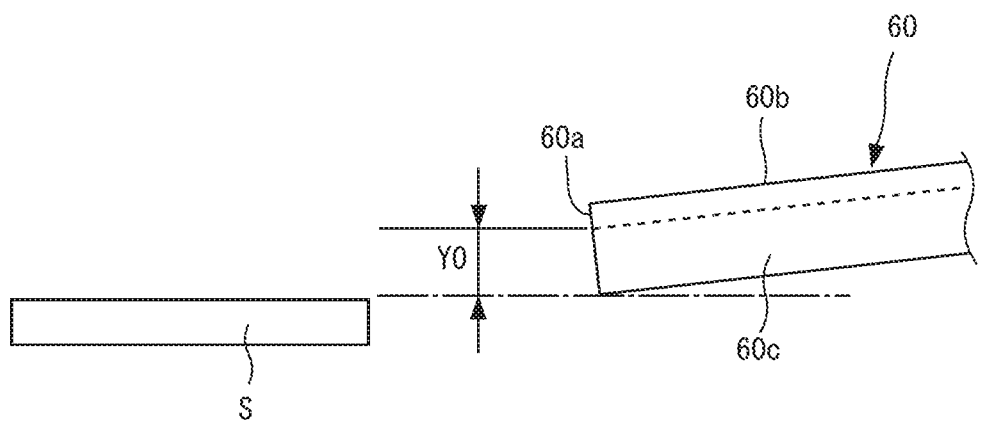
FIG. 4B is an enlarged front view showing a main part of the X-ray shielding member of FIG. 4A.

For example, as shown in FIGS. 4A and 4B, the X-ray shielding member 60 comprising the strip-shaped flat plate may be configured to be bent at both the side edges of the strip-shaped flat plate, thereby forming side edge portions 60c at both the side edges of the flat plate. This configuration increases the mechanical strength of the X-ray shielding member 60 because the side edge portions 60c serve as ribs.

Furthermore, by matching the height of the side edge portions 60c with the height Y0 calculated by the mathematical formula (2), the height of the X-ray shielding member with respect to the surface of the sample S can be adjusted using the side edge portions 60c as a guide, thereby facilitating an adjustment work when the X-ray shielding member 60 is installed on the counter arm 52.

Examples

The inventors of the present application executed an X-ray diffraction measurement under the following measurement condition by using the X-ray diffraction apparatus of the present invention configured as shown in FIG. 1A, and measured the intensity of diffracted X-rays detected by the X-ray detector 40.

[Measurement Condition]

A Cu target was used for the X-ray source 10, and a one-dimensional detector was used as the X-ray detector 40. The X-ray diffraction measurement was performed while a sample S of Si powder was irradiated with X-rays from the X-ray source 10 and the scan angle $\theta$ of the counter arm 52 with respect to the surface of the sample S was changed in the range from 0 to 80 degrees (in other words, the scan angle $2\theta$ with respect to incident X-rays was changed in the range from 0 to 160 degrees).

The dimensions of the respective constituent elements shown in FIGS. 3A and 3B were set as follows. The apertures of both the receiving slit 41 and the anti-scatter slit 42 were set to 20 mm.

Figure 7:
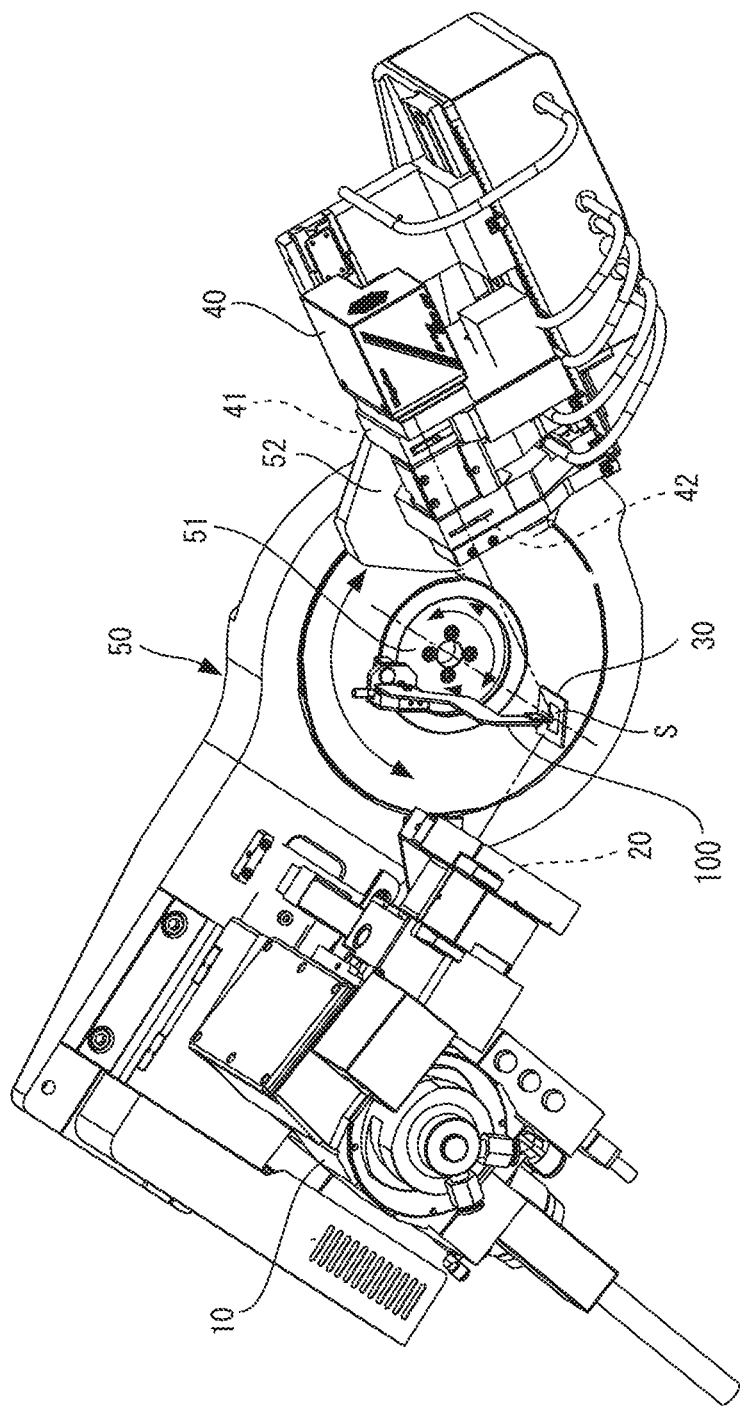
FIG. 7 is a perspective view showing the external appearance of a conventional apparatus 1 used as a comparative example for the embodiment of the present invention.
Figure 8A:
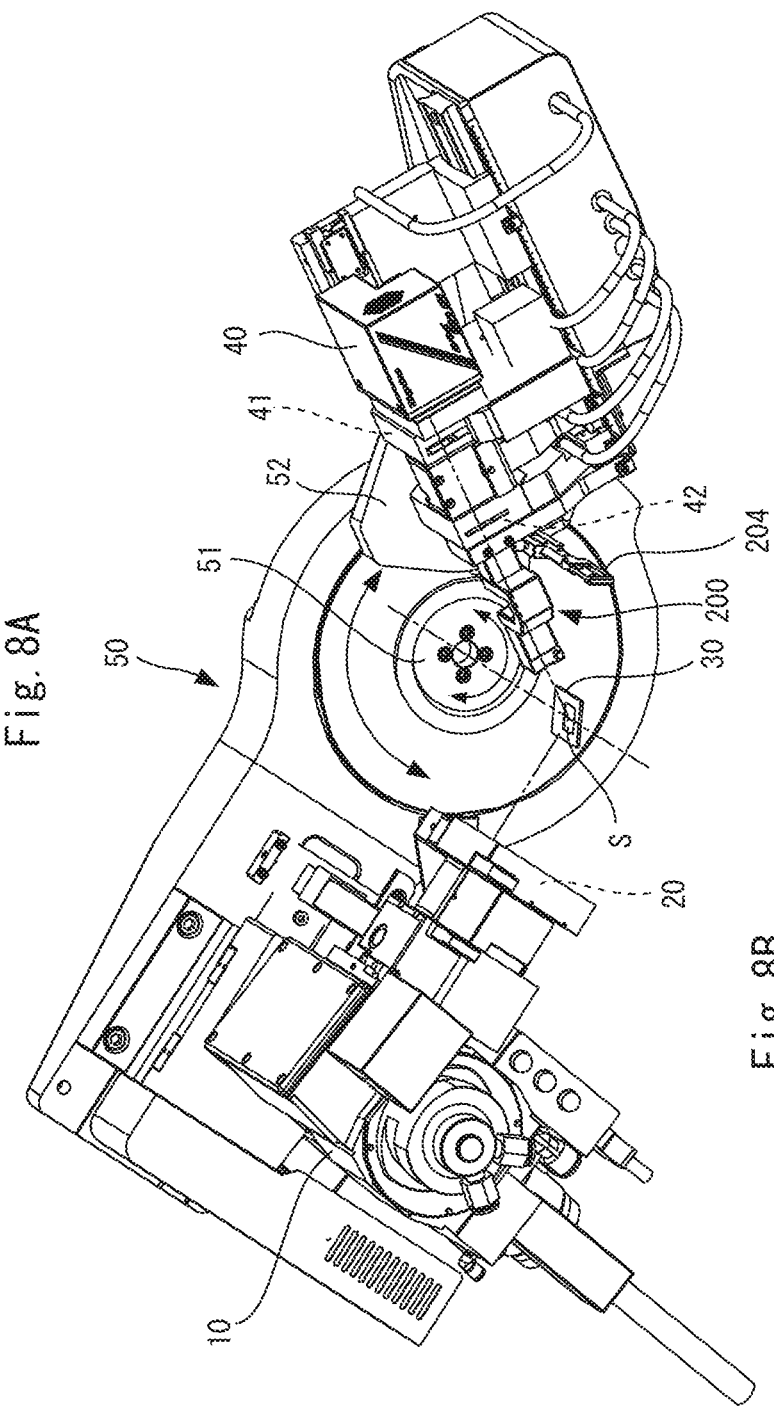
FIG. 8A is a perspective view showing the external appearance of a conventional apparatus 2 used as a comparative example for the embodiment of the present invention.
Figure 8B:
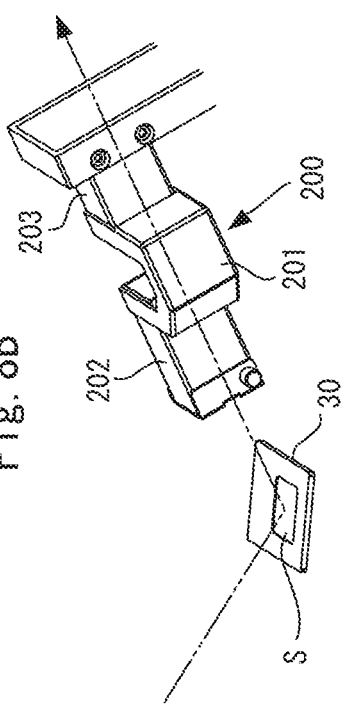
FIG. 8B is an enlarged perspective view showing the X-ray shielding tube.

R=300 mm, $\theta$max=80 deg., $\theta$1=7.27 deg., W=20 mm, DS=½ (deg.), D=19.2 mm, X0=30 mm and Y0=1.5 mm Comparative Examples X-ray diffraction measurements were performed by using a conventional apparatus 1 having the configuration shown in FIG. 7 and a conventional apparatus 2 having the configuration shown in FIGS. 8A and 8B to measure the intensities of diffracted X-rays detected by the X-ray detector 40.

The conventional apparatus 1 was an X-ray diffraction apparatus (corresponding to the apparatus disclosed in Patent Document 1) in which a plate-like X-ray shielding member 100 was fixed to confront the sample S, and the gap between the sample S and the X-ray shielding member 100 was fixed to 1.5 mm. A measurement result using the conventional apparatus 1 is referred to as "comparative example 1".

Furthermore, the conventional apparatus 2 was an X-ray diffraction apparatus in which the X-ray shielding tube 200 was installed on the counter arm 52, and performed X-ray diffraction measurements under a condition that the lower edge of the distal end of the X-ray shielding tube 200 was arranged away from the center of the sample S by 50 mm (that is, X0=50 mm), and under a condition that the lower edge of the distal end of the X-ray shielding tube 200 was arranged away from the center of the sample S by 120 mm (that is, X0=120 mm). A measurement result using the conventional apparatus 2 under the condition that the position of the lower edge of the distal end of the X-ray shielding tube 200 was set to X0=50 mm is referred to as "comparative example 2". A measurement result using the conventional apparatus 2 under the condition that the position of the lower edge of the distal end of the X-ray shielding tube 200 was set to X0=120 mm is referred to as "comparative example 3".

In addition, an X-ray diffraction measurement was performed by using an apparatus in which the X-ray shielding member 60 was removed from the X-ray diffraction apparatus used in the above-described embodiment, and a measurement result of this apparatus is referred to as "comparative example 4".

[Measurement Result]

Measurement data shown in FIGS. 5 and 6 were obtained as a result of the X-ray diffraction measurements executed under the above conditions. FIG. 5 shows the measurement result in the low-angle scan region (the scan angle 2θ with respect to the incident X-rays ranges from 0 to 50 degrees), and FIG. 6 shows the measurement result in the high-angle scan region (the scan angle 2θ with respect to the incident X-rays ranges from 136 to about 139 degrees).

As shown in FIG. 5, in the low-angle scan region, the measurement result of the embodiment of the present invention is substantially the same as the measurement result of the comparative example 1 in which the plate-like X-ray shielding member 100 is fixed so as to confront the sample S. On the other hand, it is found from the measurement results of the comparative examples 2 to 4 that the detected X-ray intensities of the comparative examples 2 to 4 are higher than that of the embodiment of the present invention in the low-angle scan region except for scan angles (A and B) at which the diffracted X-rays have peak intensities. This is because a lot of scattered X-rays are incident to the X-ray detector 40 and thus the background noise increases.

Figure 9A:
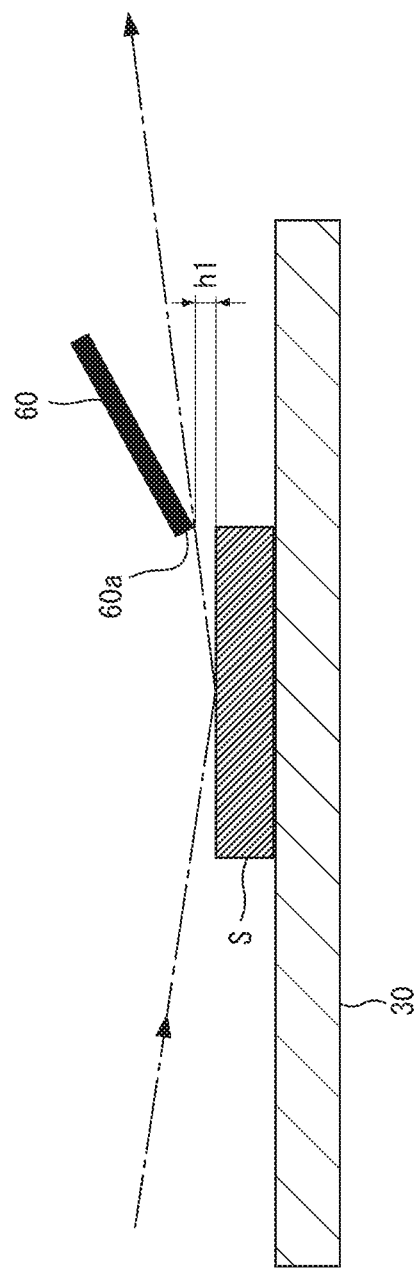
FIGS. 9A and 9B are explanatory diagrams showing the difference in action and effect between the embodiment of the present invention and conventional apparatus 2.
Figure 9B:
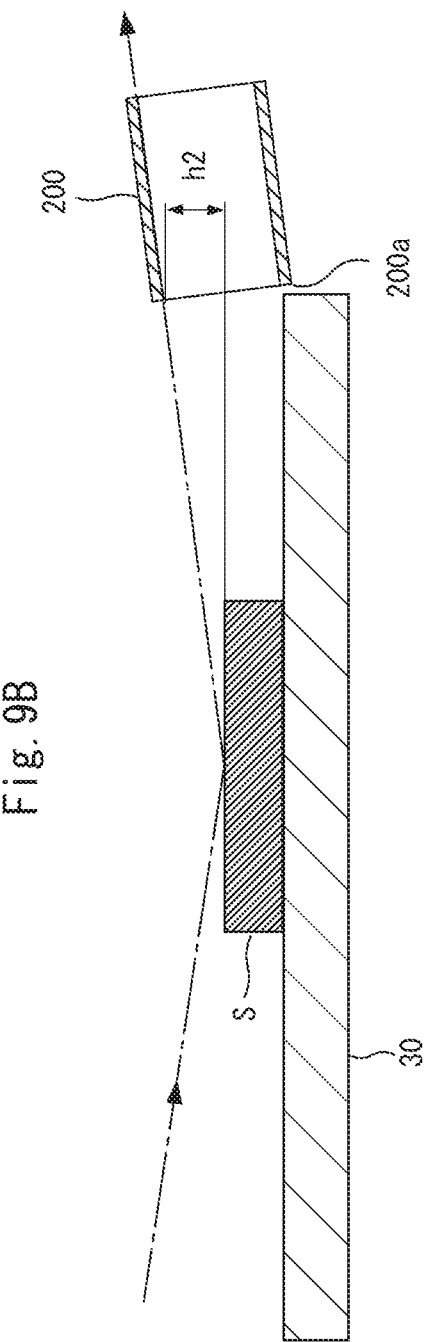

Particularly, as shown in FIG. 9B, in the X-ray diffraction apparatus (the conventional apparatus 2) in which the X-ray shielding tube 200 is installed on the counter arm 52, the bottom portion 200a of the distal end of the X-ray shielding tube 200 interferes with the sample stage 30, so that the X-ray shielding tube 200 cannot be approached to the sample S. Therefore, in the low-angle scan region, the X-ray shielding tube 200 captures diffracted X-rays at a position distant from the sample S, so that the X-ray shielding tube 200 must be arranged at a higher position than the surface of the sample S. Therefore, a wide gap h2 occurs on the low angle side of diffracted X-rays diffracted from the sample S, and scattered X-rays pass through this wide gap h2 and are incident to the X-ray detector 40, resulting in increase of the background noise.

On the other hand, in the case of the X-ray diffraction apparatus used in the embodiment of the present invention, there is no risk that the X-ray shielding member 60 interferes with the sample stage 30 as shown in FIG. 9A, and thus the distal end 60a of the X-ray shielding member 60 can be approached to the sample S. Therefore, the gap h1 between the surface of the sample S and the X-ray shielding member 60 can be set to be narrow, so that the background noise can be reduced as in the case of the comparative example 1.

Furthermore, as shown in FIG. 6, the measurement result of the embodiment of the present invention in the high-angle scan region indicates that a higher X-ray intensity as a whole was detected as compared with the comparative example 1 in which the plate-like X-ray shielding member 100 is fixed to confront the sample S. The measurement results of the comparative examples 2 to 4 in the high-angle scan region indicate that the same level of X-ray intensities as the measurement result of the embodiment of the present invention were detected.

The X-ray shielding member 100 used in the comparative example 1 can effectively shield scattered X-rays by the X-ray shielding member 100 in the low-angle scan region as shown in FIG. 10A. However, in the high-angle scan region, the fixed X-ray shielding member 100 shields X-rays emitted from the X-ray source 10 to the sample S and also diffracted X-rays diffracted from the sample S as shown in FIG. 10B, so that the incident amount of diffracted X-rays to the X-ray detector 40 is reduced.

When the X-ray detector 40 is moved to the high-angle scan region, the X-ray shielding member 60 used in the embodiment of the present invention is moved so that the distal end 60a of the X-ray shielding member 60 is farther away from the surface of the sample S in connection with the movement of the X-ray detector 40, so that the X-ray shielding member 60 does not shield X-rays emitted from the X-ray source 10 to the sample S and also diffracted X-rays diffracted from the sample S, and proper intensity data of the diffracted X-rays can be achieved.

For example, when the lower edge of the distal end 60a of the X-ray shielding member 60 is set at the position of X0=30 mm and Y0=1.5 mm while the X-ray detector 40 is arranged at the origin of scanning on the low angle side (the angle of the X-ray detector with respect to the surface of the sample S: θmin=0 deg. and the angle of the X-ray detector with respect to incident X-rays: 2θmin=0 deg.), the height dimension between the lower edge of the distal end 60a of the X-ray shielding member 60 and the surface of the sample S varies as follows according to the rotation of the counter arm 52: the height is equal to 1.5 mm for 2θ=0 deg; the height is equal to 2.8 mm for 2θ=5 deg; the height is equal to 4.1 mm for 2θ=10 deg; the height is equal to 6.7 mm for 2θ=20 deg; the height is equal to 14.0 mm for 2θ=50 deg; the height is equal to 23.9 mm for 2θ=100 deg; and the height is equal to 29.8 mm for 2θ=160 deg.

In the X-ray diffraction apparatus used in the embodiment of the present invention, an X-ray shielding plate (a member represented by reference numeral 204 in FIG. 8A) called as a direct beam stopper may be arranged below the X-ray shielding member 60 in a low-angle scan region (2θ=10 deg. or less) where the background noise has a tendency to increase. The direct beam stopper shields X-rays which are emitted from the X-ray source and pass through the low angle side of diffracted X-rays in the low-angle scan region, thereby reducing the background noise.

In the above embodiment, the arrangement of the X-ray shielding member relative to the surface of the sample is determined based on the distance between the rotation center of the counter arm and the lower edge of the distal end of the X-ray shielding member. However, any position of the distal end of the X-ray shielding member such as the upper edge or the center of the distal end may be adopted in place of the lower edge of the distal end to determine the arrangement position of the X-ray shielding member.

As a person skilled in the art will readily appreciate, the above description is meant as an illustration of the principles of this invention. This description is not intended to limit the scope or application of this invention in that the invention is susceptible to modification, variation, and change, without departing from the spirit of this invention, as defined in the following claims.

The invention claimed is:

1. An X-ray diffraction apparatus comprising:
an X-ray detector that is configured to detect focused diffracted X-rays diffracted from a sample when a surface of the sample is irradiated with divergent X-rays;
a counter arm that is configured to rotate around a rotation center axis set within the surface of the sample while the X-ray detector is installed on the counter arm; and
an X-ray shielding member that is configured to be installed on the counter arm and rotated together with the X-ray detector,
wherein the counter arm is configured to rotationally scan the X-ray detector to a high angle side where an inclination angle of the X-ray detector with respect to the surface of the sample increases while a position within a plane flush with the surface of the sample is set as an origin of scanning on a low angle side, and the X-ray shielding member is arranged on a high angle side with respect to focused diffracted X-rays that are diffracted from the sample and incident to the X-ray detector, and
wherein the X-ray shielding member being installed on the counter arm and rotating together with the X-ray detector establishes, by the distal end thereof, a boundary of the high angle side through which the focused diffracted X-rays are transmissible, and has a surface inclined with respect to a straight line connecting the distal end and a center of an X-ray irradiation region on the surface of the sample.

2. The X-ray diffraction apparatus according to claim 1, further comprising a configuration for limiting a divergence angle of X-rays emitted from an X-ray source by a divergence angle limiting slit, wherein an optimum position of the X-ray shielding member is set to a position at which the distal end of the X-ray shielding member is spaced from the rotation center axis of the counter arm within a plane flush with the surface of the sample by only a distance $X0$ calculated by the following mathematical formula (1), and higher than the surface of the sample by only a height $Y0$ calculated by the following mathematical formula (2) while the X-ray detector is arranged at the origin of scanning on the low angle side:

$$X0 = R\{\cos(90deg - \theta\max) - \sin(90deg - \theta\max) \times \tan(\theta\max - DS/2)\} \quad (1)$$

$$Y0 = \frac{(W/2) \times \sin(\theta 1) + \{(W/2) \times \cos(\theta 1) + X0\} \times \{D/2 - (W/2) \times \sin(\theta 1)\}}{R + (W/2) \times \cos(\theta 1)} \quad (2)$$

wherein R represents the distance from the rotation center of the counter arm to a detection face of the X-ray detector, θmax represents a maximum scan angle on the high angle side of the counter arm, DS represents an angle of aperture of the divergence angle limiting slit, W represents a width of the sample, θ1 represents an incident angle of X-rays with respect to the surface of the sample when the irradiation width of X-rays is equal to the width of the sample, and D represents a length of the detection face of the X-ray detector in the scan direction.

3. The X-ray diffraction apparatus according to claim 2, wherein the X-ray shielding member comprises a strip-shaped flat plate, the strip-shaped flat plate being bent at both the side edges thereof to form side edge portions, and the height of the side edge portions is matched with the height Y0 calculated by the mathematical formula (2).

4. The X-ray diffraction apparatus according to claim 1, wherein the X-ray detector is a one-dimensional detector or a two-dimensional detector.

5. An X-ray diffraction apparatus comprising:
an X-ray detector that is configured to detect focused diffracted X-rays diffracted from a sample when a surface of the sample is irradiated with divergent X-rays;
a counter arm that is configured to rotate around a rotation center axis set within the surface of the sample while the X-ray detector is installed on the counter arm; and
a platelike X-ray shielding member that is configured to be installed on the counter arm and rotated together with the X-ray detector,
wherein the counter arm is configured so as to rotationally scan the X-ray detector to a high angle side where an inclination angle of the X-ray detector with respect to the surface of the sample increases while a position within a plane flush with the surface of the sample is set as an origin of scanning on a low angle side, and the X-ray shielding member is arranged on a high angle side with respect to focused diffracted X-rays that are diffracted from the sample and incident to the X-ray detector, and
wherein the X-ray shielding member being installed on the counter arm and rotating together with the X-ray detector establishes, by a distal end thereof, a boundary of the high angle side through which the focused diffracted X-rays are transmissible, and is arranged so that a surface portion thereof is inclined with respect to a straight line connecting the distal end of the X-ray shielding member and the center of an X-ray irradiation region on the surface of the sample, whereby scattered X-rays that can be incident from the high angle side of the focused diffracted X-rays to the X-ray detector are shielded by the surface portion.

6. An X-ray diffraction apparatus comprising:
an X-ray detector that is configured to detect diffracted X-rays diffracted from a sample when a surface of the sample is irradiated with X-rays;
a counter arm that is configured to rotate around a rotation center axis set within the surface of the sample while the X-ray detector is installed on the counter arm;
a platelike X-ray shielding member that is adapted to be installed on the counter arm and rotated together with the X-ray detector; and
a configuration for limiting a divergence angle of X-rays emitted from an X-ray source by a divergence angle limiting slit,
wherein the counter arm is configured so as to rotationally scan the X-ray detector to a high angle side where an inclination angle of the X-ray detector with respect to the surface of the sample increases while a position within a plane flush with the surface of the sample is set as an origin of scanning on a low angle side, and the X-ray shielding member is arranged on a high angle side with respect to diffracted X-rays that are diffracted from the sample and incident to the X-ray detector, and
wherein the X-ray shielding member establishes, by a distal end thereof, a boundary of the high angle side through which the diffracted X-rays are transmissible, and is arranged so that a surface portion thereof is inclined with respect to a straight line connecting the distal end of the X-ray shielding member and the center of an X-ray irradiation region on the surface of the sample, whereby scattered X-rays that can be incident from the high angle side of the diffracted X-rays to the X-ray detector are shielded by the surface portion, and wherein an optimum position of the X-ray shielding member is set to a position at which the distal end of the X-ray shielding member is spaced from the rotation center axis of the counter arm within a plane flush with the surface of the sample by only a distance X0 calculated by the following mathematical formula (1), and higher than the surface of the sample by only a height Y0 calculated by the following mathematical formula (2) while the X-ray detector is arranged at the origin of scanning on the low angle side:

$$X0 = R\{\cos(90deg - \theta max) - \sin(90deg - \theta max) \times \tan(\theta max - DS/2)\} \quad (1)$$

$$Y0 = \frac{(W/2) \times \sin(\theta 1) + \{(W/2) \times \cos(\theta 1) + X0\} \times \{D/2 - (W/2) \times \sin(\theta 1)\}}{R + (W/2) \times \cos(\theta 1)} \quad (2)$$

wherein R represents the distance from the rotation center of the counter arm to a detection face of the X-ray detector, $\theta max$ represents a maximum scan angle on the high angle side of the counter arm, DS represents an angle of aperture of the divergence angle limiting slit, W represents a width of the sample, $\theta 1$ represents an incident angle of X-rays with respect to the surface of the sample when the irradiation width of X-rays is equal to the width of the sample, and D represents a length of the detection face of the X-ray detector in the scan direction.

* * * * *